June 9, 1931. B. H. DUNKLEY 1,808,887
HOBBY HORSE
Filed May 23, 1930
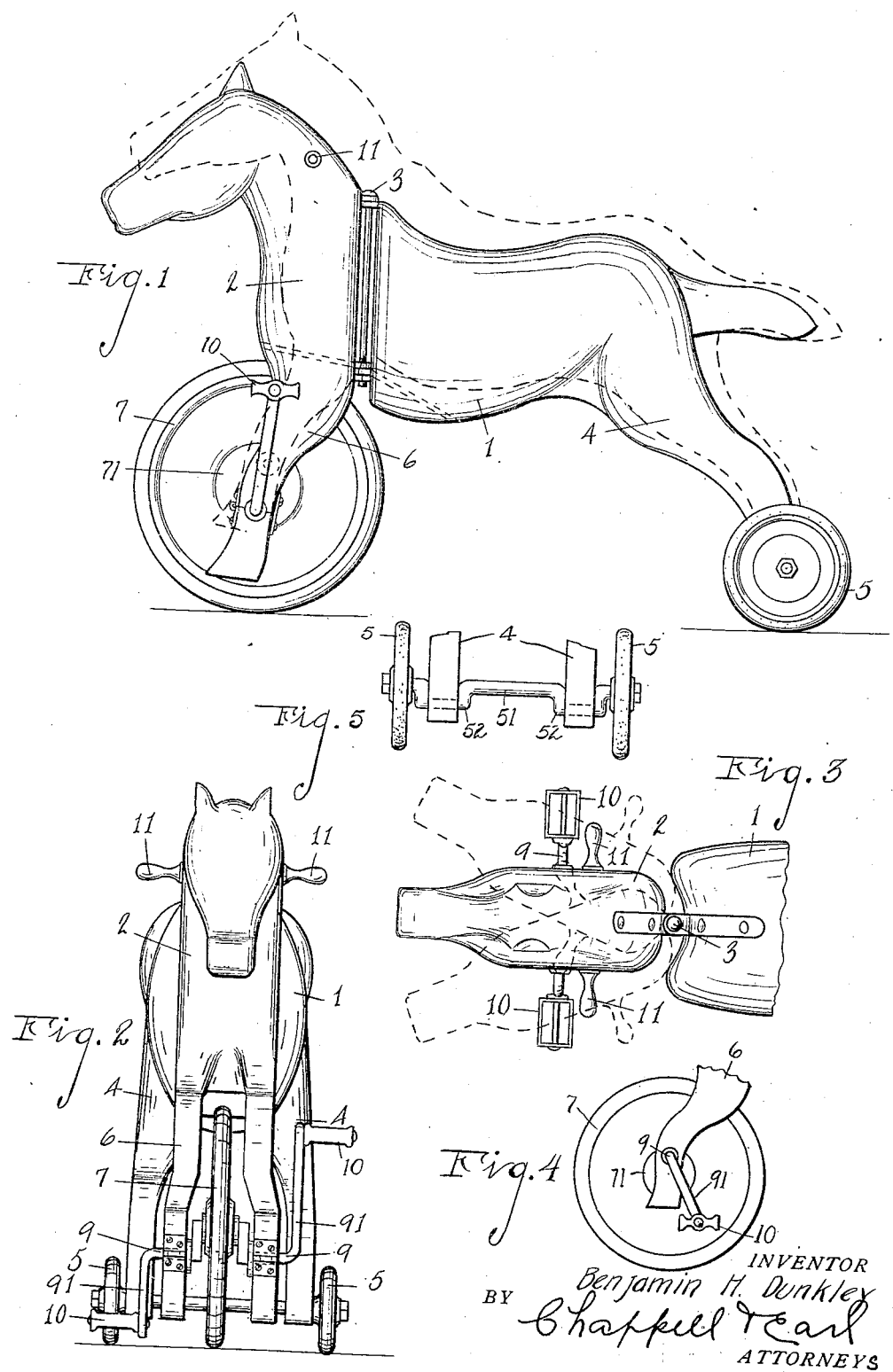
INVENTOR
Benjamin H. Dunkley
BY Chappell Earl
ATTORNEYS Patented June 9, 1931

1,808,887

UNITED STATES PATENT OFFICE

BENJAMIN H. DUNKLEY, OF KALAMAZOO, MICHIGAN

HOBBY HORSE

Application filed May 23, 1930. Serial No. 454,897.

The object of this invention is to provide a very simple construction of hobby horse which will have a pronounced galloping motion and at the same time be capable of effective propulsion and steering.

Objects relating to structural details will appear from the detailed description to follow. The invention is defined and pointed out in the claims.

A structure which is a preferred embodiment of my invention is illustrated in the accompanying drawings, forming a part of this specification, in which:

Fig. 1 is a side elevation view of a hobby horse embodying the features of my invention, the raised portion being indicated in dotted lines.

Fig. 2 is a front elevation view.

Fig. 3 is a detail plan view of the front portion showing the method of pivoting the front part for steering.

Fig. 4 is a detail side elevation view of a modification of the front wheel in which the crankshaft is merely secured eccentrically to the wheel.

Fig. 5 is a detail end elevation view of the rear axle structure.

The parts of the drawings will be identified by their numerals of reference which are the same in all the views.

1 is the body of the hobby horse. 2 is the fore part of the horse, embracing the shoulders, front legs, head and neck. These parts 1 and 2 are pivoted together by the vertical hinge pivot 3, clearance being provided between the parts so that the front portion of the horse can be deflected considerably from side to side, as indicated by the dotted lines in Fig. 3. 4 are the rear legs of the horse which are rigid and project out to the rear, being provided with carrying wheels 5. The rear carrying wheels 5 are supported on a crank axle 51 the cranks 52 of which are journaled in the lower ends of the legs 4 so that, as the hobby-horse advances, the rear wheels will oscillate up and down.

6 are the front legs of the horse which project downwardly and forwardly and are in spaced relation to each other side by side at the front, affording a journal bearing for the off-set crankshaft 9 on the center of which is rigidly mounted the wheel 7. The crankshaft 9 is journaled eccentric to the center of the wheel, as seen in Figs. 1 and 2. The cranks 91 terminate in pedals 10, making it possible to pedal the structure after the manner of a bicycle. The eccentric location of the crankshaft causes an eccentric movement, which gives the horse the galloping motion indicated by the dotted lines in Fig. 1. Handles 11, 11 are at the upper opposite sides of the neck to be grasped by the rider for steering, permitting the manipulation of the front portion of the horse like a steering post in the manner indicated in Fig. 3.

In Fig. 4 I show the structure in a simple form available on a disk style of hub. The wheel 7 has a disk hub 71 and the crankshaft is straight and secured rigidly eccentric, as shown. The action is the same.

The result is a very satisfactory hobby-horse, giving the movement of a galloping horse as it progresses, and being capable of steering from side to side. A similar result can be obtained by a front wheel deformed from a circle, such as an ellipse. I desire to claim the invention specifically and also broadly, as indicated in the appended claims.

Having thus described my invention what I claim as new and desire to secure by Letters Patent is:

1. In a hobby horse, the combination of the body of the horse, the front portion of the horse hinged thereto by vertical pivot, wheels for the rear legs of the horse, a crankshaft axle therefor the cranks of which are journaled to the lower ends of said rear legs, a driving floor wheel disposed between and guided by the front legs of the horse and having an extended hub, a crankshaft with an off-set center with its bearing disposed eccentrically to the center of the hub through the fore legs of the horse, cranks and pedals on the opposite ends of said crankshaft, and handles at each side of the horse's neck for steering the same, coacting as described for the purpose specified.

2. In a hobby horse, the combination of the body of the horse, the front portion of the horse hinged thereto by vertical pivot, wheels for the rear legs of the horse, a crankshaft axle therefor the cranks of which are journaled to the lower ends of said rear legs, a driving floor wheel disposed between and guided by the front legs of the horse and having an extended hub, a crankshaft with its bearing disposed eccentrically to the center of the hub through the fore legs of the horse, cranks and pedals on the opposite ends of said crankshaft, and handles at each side of the horse's neck for steering the same, coacting as described for the purpose specified.

3. In a hobby horse, the combination of the body divided vertically and hinged by vertical pivot, wheels for the rear legs, a driving floor wheel disposed between the front legs, a crankshaft with an off-set center journaled eccentrically to the said wheel having bearings through the said legs, and suitable pedals for driving the same, as specified.

In witness whereof I have hereunto set my hand.

BENJAMIN H. DUNKLEY.